Oct. 4, 1932.      H. G. TRAVER      1,881,151
CAR FOR AMUSEMENT RIDES
Original Filed Dec. 15, 1927
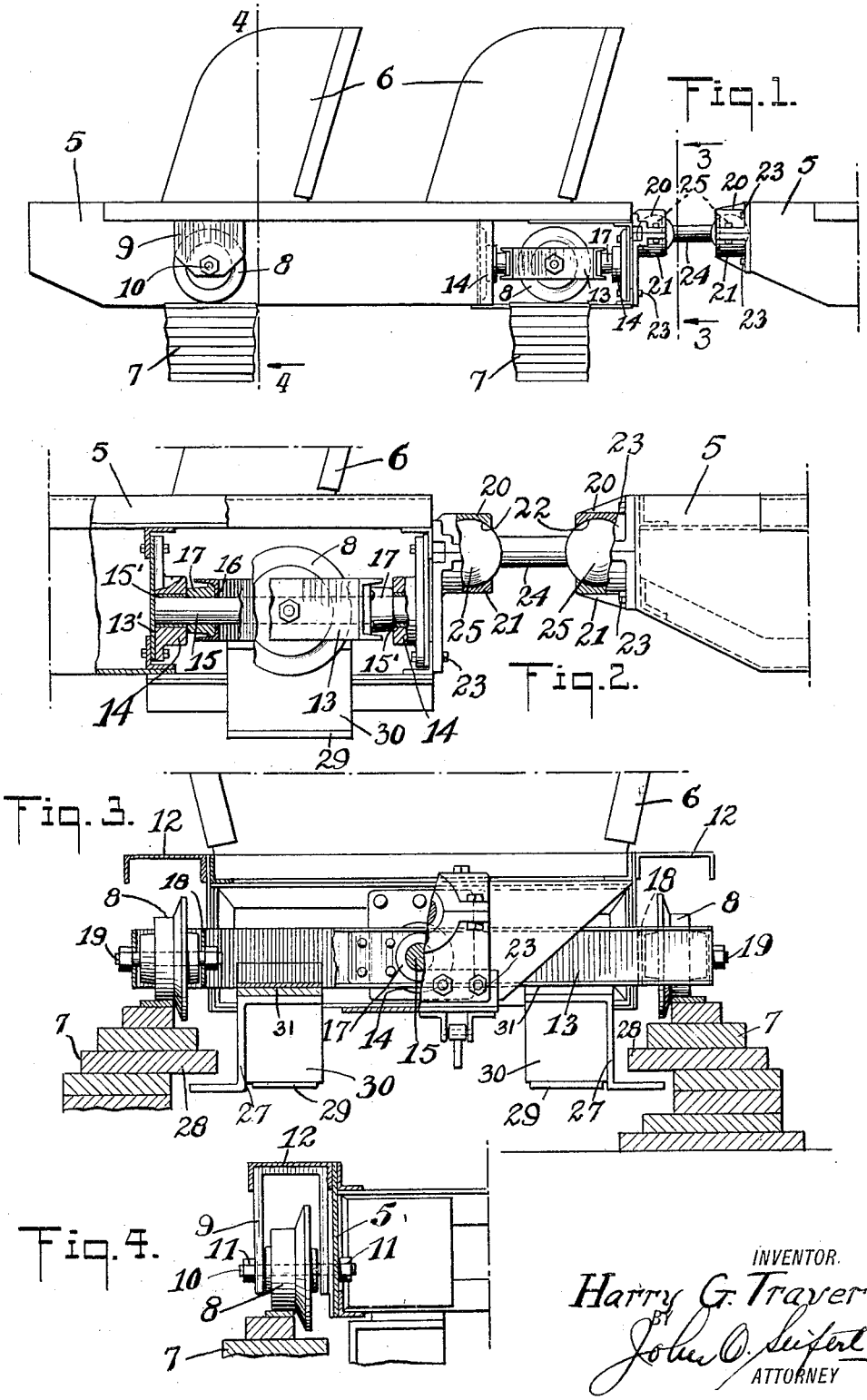

Patented Oct. 4, 1932

1,881,151

UNITED STATES PATENT OFFICE

HARRY G. TRAVER, OF BEAVER FALLS, PENNSYLVANIA

CAR FOR AMUSEMENT RIDES

Application filed December 15, 1927, Serial No. 240,099. Renewed February 27, 1932.

This invention relates to the structure of passenger carrying cars used in connection with amusement rides, particularly to gravity coaster rides, and it is an object of the invention to provide a car having a seat carrying body aranged at each end with a pair of traction wheels with the body supported by the wheels at one end to permit of said wheels and the body to have movement one relative to the other on the longitudinal axis of the car to adapt the car to readily negotiate curved and banked portions of a track upon which the car or a train of cars is propelled.

A further object of the invention is to provide an improved coupling means for coupling the cars of a train of cars together to permit of universal movement of adjacent cars in a train of cars one relative to the other whereby the cars may readily adapt themselves to curved and banked portions of a track and undulated portions of a track upon which the train of cars is propelled.

Other objects and advantages will hereinafter appear.

In carrying out the invention the car is provided with a seat carrying body arranged at the front end with a pair of traction wheels rotatably mounted in carrying members therefor fixed to opposite sides of the body, and at the rear with a truck carrying a pair of wheels with means to mount the car thereon to permit of the car and the wheel carrying truck to have movement as a unit one relative to the other on a longitudinal axis of the car body so that as the car passes onto and off from curved and banked portions of a track no tipping of the car body will be effected with the possibility of the wheels leaving the track, and to allow the cars in a train of cars to be tipped or tilted one independently of and relative to the other.

In the drawing accompanying and forming a part of this application, Figure 1 is an elevational view of a passenger carrying car constructed in accordance with the present invention and engaged on a section of a track, and also showing the means for coupling the cars in a train.

Figure 2 is an enlarged sectional view of the rear portion of a car showing the mounting of a wheel carrying truck and supporting one end of a car thereby, and also showing the means for coupling cars in a train.

Figure 3 is a rear view of the car taken on the line 3—3 of Figure 1 looking in the direction of the arrows and showing part of the coupling means, the body being broken away to show the wheel carrying truck also shown partly in section; and Figure 4 is a view showing the mounting of the car body on the front wheels.

Similar characters of reference designate like parts throughout the different views of the drawing.

In the embodiment of the invention illustrated there is provided a car body 5 arranged with two transversely extending seats 6, the car being adapted to be propelled along track 7 the rails of which are constructed of laminated boards in a well known manner and mounted on a track supporting structure having an up-track portion and a coaster portion arranged with dips and risers which is of the usual structure and illustration thereof is therefore not deemed necessary to an understanding of the invention. The cars are arranged with a set of four wheels 8 of the flanged type, two of the wheels being rotatably mounted in inverted U-shaped brackets 9 fixed to the sides of and adjacent to the front end of the car body, the wheels being mounted in said brackets by axles 10 having the ends threaded and passed through the hubs of the wheels and the ends extended through perforations in the legs of the brackets and the sides of the car frame and secured in said brackets by the engagement of nuts 11 on the threaded ends, as shown in Figure 4. The bases of the brackets are seated in inverted channel members 12 of the body frame which hold the brackets against lateral and longitudinal movement.

In a ride of this type it is desirable that the ride be of considerable length and take up a minimum amount of ground area, and in order to do this the track structure is reversed upon itself resulting in sharp curved and banked track sections. The cars are adapted for coupling a number of the cars together to form a train of cars, and to prevent the cars from leaving the track and turning over, and to also impart the sensation of a gliding effect to the passengers of the cars during the passage thereof over these sections of the track, a pair of the wheels at one end of the car, in the present instance the rear wheels, are connected with the car body to adapt the car and said wheels to have movement one relative to the other on the longitudinal axis of the car body. In order to accomplish this result there is provided a wheel carrying truck in the form of a rectangular frame 13 extending transversely of the width and beyond the sides of the car body, and pivotally supported by bearing members 14, one of which bearing members is mounted on the end member of the car frame and the other bearing member on a member 13' extending transversely of and in spaced relation to said frame member, and arranged in the longitudinal axis of the body, as shown in Figures 1 and 2. The frame is supported by the bearing members by a spindle or shaft 15 loosely mounted in bushings 15' in the bearing members and extended through perforations 16 in the opposite members of the truck frame of larger diameter that the cross sectional diameter of the spindle, and in bearing members or bushings 17 mounted on the truck frame in alinement with the perforations 16 therein. The rear wheels 8 are rotatably carried at the sides of the truck frame in channels formed by members 18 fixed to the ends of the truck frame and extending in spaced and parallel relation to the side members thereof. The members 18 and sides of the truck frame are arranged with alined perforations for the engagement of axles 19 on which the rear wheels 8 are rotatably mounted, the axles being secured by nuts engaging the threaded ends thereof, as shown in Figure 3.

In use the cars are preferably connected in a train, and to permit of the cars of the train to independently adjust themselves one relative to the other to compensate for curved and banked portions of the track along which the car train is propelled and thus prevent the cars leaving the track or turning over by the sudden tipping thereof, improved means are provided to couple the cars together and permit one car to have movement relative to an adjacent car coupled thereto. For this purpose a socket member is mounted on the ends of the cars comprising two sections 20, 21, each section having the interior surface of semi-spherical shape, as shown at 22, the sections being fixed to the car ends by bolts, as shown at 23, extended through perforations in laterally extending flanges of the sections of the socket members with the semi-spherical surfaces in opposed relation and thus forming a socket within the sections.

To couple and unite the socket members and thereby the cars together there is provided a link in the form of a rigid rod or bar 24 arranged with spherical enlargements or heads 25 at the opposite ends, which heads are adapted for engagement in the sockets formed by the semi-spherical surfaces of the sections 20, 21 when they are assembled on the car.

As a further assurance of preventing the cars from jumping the tracks they are arranged with safety shoes 27 Z-shaped in cross section and fixed to the bottom of parallel strips 31 extending longitudinally of the car body and suspended at the ends from the lower edge of the ends of the truck frame 13 with the lower right angle portions of the shoes arranged to extend outwardly to a position below inward extensions 28 of the track rail structure when the cars are engaged on the track, as shown in Figure 3, said shoes being normally free of said track rail extensions 28 and adapted to engage thereshoes when the car wheels leave the track.

To retard the movement of and stop the cars at a predetermined point in the ride brake shoes 29 are carried by blocks 30 fixed to the bottom of the portion of the shoes 27 fixed to the strips 31 and the adjacent portion of the shoes, said shoes being adapted for the frictional engagement of brake rails (not shown) adapted to be moved into engagement therewith. The brake blocks serve as abutments to take up stresses and strains exerted upon the portions of the safety shoes extending below the track rail extensions and brought into engagement therewith should the car wheels leave the track.

While I have illustrated and described one embodiment of my invention it will be obvious that various modifications may be made in construction and arrangement of the parts, and that portions of the invention may be used without others, and come within the scope of the invention.

Having thus described my invention I claim:

1. In a passenger car for amusement rides, a body supporting frame, traction wheels, wheel supports fixed at the front of the body, and a wheel carrying truck mounted on the rear of the body comprising a rectangular frame pivotally supported by and on the longitudinal axis of the body frame with the truck frame extending in the plane of the body frame and wheels rotatably mounted on the frame to permit of the body and truck with the wheels to have movement relative to each other on the longitudinal axis of the body.

2. A passenger car for amusement rides as claimed in claim 1, wherein the wheel carrying truck support comprises bearing members fixed to and in the plane of the body frame, a spindle extended through openings in opposite members of the truck frame and mounted at the ends in said bearing members, and bushings carried by the truck frame to support the same upon the spindle.

3. A passenger car for amusement rides as claimed in claim 1, wherein the truck frame is arranged with members in spaced and parallel relation to the side members thereof to co-operate with said sides to rotatably support the traction wheels.

4. A passenger car for amusement rides as claimed in claim 1, wherein the wheel carrying truck support comprises, spaced and parallelly arranged members extending transversely and in the plane of the body frame and having bearing members fixed thereto arranged on the longitudinal axis of the body, a spindle rotatably mounted in said bearing members and extending through the truck frame parallel to the sides thereof, and bushings fixed to the ends of the truck frame to support said frame on the spindle in the plane of the body frame.

5. In passenger carrying cars for amusement rides, a body embodying substantially a rectangular frame and arranged with a transverse member in parallel and spaced relation to an end frame member, wheel carrying members fixed to opposite sides and adjacent one end of the body frame to support said end of the car, a truck comprising a rectangular frame having pairs of parallelly arranged and spaced side members, wheels rotatably carried by each pair of said side members within the space between said members and midway the ends thereof, and an axle extended through the end members of the truck frame midway the sides thereof and supported in the end and transverse members of the body frame in line with the longitudinal axis of the car to permit the body and wheel carrying truck frame to have movement one relative to the other on the longitudinal axis of the body.

Signed at Beaver Falls, in the county of Beaver and State of Pennsylvania, this ninth day of December, 1927.

HARRY G. TRAVER.